(12) United States Patent
Nakada et al.

(10) Patent No.: US 6,997,554 B2
(45) Date of Patent: Feb. 14, 2006

(54) METHOD OF MARKING OPHTHALMIC LENS BY USING LASER RADIATION

(75) Inventors: Kazuhiko Nakada, Nisshin (JP); Hiroaki Suzuki, Toki (JP); Kenichi Ishihara, Kasugai (JP); Yuuji Gotou, Kakamigahara (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 10/991,842

(22) Filed: Nov. 18, 2004

(65) Prior Publication Data

US 2005/0073646 A1 Apr. 7, 2005

Related U.S. Application Data

(63) Continuation of application No. 10/638,665, filed on Aug. 11, 2003, now Pat. No. 6,857,744.

(51) Int. Cl.
*G02C 7/02* (2006.01)

(52) U.S. Cl. ...................................... 351/177; 351/159
(58) Field of Classification Search ................ 351/51, 351/159, 160 R, 160 H, 161–64, 166–68, 351/174, 177–8; 359/440
See application file for complete search history.

(56) References Cited

U.S. PATENT DOCUMENTS

| 4,194,814 A | | 3/1980 | Fischer et al. ........... 351/160 R |
| 5,817,243 A | * | 10/1998 | Shaffer ........................ 216/65 |
| 6,042,230 A | * | 3/2000 | Neadle et al. .......... 351/160 R |
| 6,203,156 B1 | | 3/2001 | Wu et al. ............... 351/160 R |
| 2002/0027638 A1 | | 3/2002 | Thakrar et al. ............. 351/162 |
| 2002/0103478 A1 | | 8/2002 | Gwon et al. .................... 606/4 |
| 2005/0007567 A1 | * | 1/2005 | Pierrat et al. ................. 355/18 |

FOREIGN PATENT DOCUMENTS

| JP | 62-37368 B2 | 8/1987 |
| JP | 64-013520 A1 | 1/1989 |
| JP | 5-67932 B2 | 9/1993 |

* cited by examiner

*Primary Examiner*—Jordan M. Schwartz
*Assistant Examiner*—Jessica Stultz
(74) *Attorney, Agent, or Firm*—Burr & Brown

(57) ABSTRACT

A method of marking an ophthalmic lens, including a step of irradiating the ophthalmic lens formed of a resin material with a laser radiation, such that the laser radiation is condensed at each of predetermined at least one spot within the ophthalmic lens, to form a whitened portion at the each of the predetermined at least one spot, for thereby providing the ophthalmic lens with a marking.

8 Claims, 3 Drawing Sheets

METHOD OF MARKING OPHTHALMIC LENS BY USING LASER RADIATION

CROSS REFERENCE TO RELATED APPLICATION

This application is a continuation of U.S. application Ser. No. 10/638,665, filed Aug. 11, 2003 now U.S. Pat. No. 6,857,744, the entirety of which is incorporated herein by reference.

This application is also based on Japanese Patent Application No. 2001-281015, filed on Sep. 17, 2001, the contents of which are incorporated hereinto by reference.

FIELD OF THE INVENTION

The present invention relates to a method of marking an ophthalmic lens such as a contact lens or an intraocular lens. More particularly, the present invention relates to a method of marking the ophthalmic lens by irradiating the ophthalmic lens with a laser radiation to thereby form, within the ophthalmic lens, a marking in the form of characters, figures, symbols, etc.

BACKGROUND OF THE INVENTION

Conventionally, an ophthalmic lens such as a contact lens or an intraocular lens is provided with an identifying mark in the form of characters, figures, symbols, etc., principally for easy distinction between the front and back surfaces of the lens or between lenses for the left and right eyes, and/or indicating the specifications of the lens, for instance. For marking the ophthalmic lens, there are known a printing method, a laser marking method, etc.

In the printing method, the ophthalmic lens is partially dyed or colored with a printing liquid containing a dye or a dyeing solution (ink). In general, the ophthalmic lens is dyed or colored by a screen printing method which uses a screen or stencil that is patterned so as to correspond to a desired identifying mark to be formed. The identifying mark formed by the printing method using the dye tends to gradually disappear or peel off due to various treatments repeatedly conducted on the lens such as cleaning of the lens by rubbing and boiling of the lens for disinfection. In view of this, various techniques have been proposed to improve the durability of the identifying mark of the lens under severe environments of use. For instance, the identifying mark is formed by coloring or dyeing the lens with the ink which permeates into the material of the lens, or the identifying mark is fixed to an inner portion of the lens with a chemical reaction of the lens material with the ink which has permeated into the lens material. In the above-described printing method employed for marking the ophthalmic lens, however, the dye may get in the polymer of the lens, and may be contained in the ophthalmic lens, causing a problem of insufficient safety.

The printing method by which the identifying mark is directly formed using the ink or dye as described above inevitably increases the number of process steps for marking the ophthalmic lens and requires additional steps and devices such as a drying step and a device for drying the ink or dye after the printing step. In addition, the ophthalmic lens needs to be handled frequently, undesirably resulting in a high defect or reject ratio of the ophthalmic lens. Accordingly, the cost of manufacture of the ophthalmic lens is undesirably increased, causing a problem of poor economy.

Examples of the laser marking method are disclosed in JP-B-62-37368 and JP-A-64-13520 wherein an ophthalmic lens is irradiated with a laser radiation, so that a mark is engraved in the lens surface. Another example of the laser marking method is disclosed in JP-B-5-67932 wherein a mark in the form of recesses and protrusions is formed, by a laser radiation, in a mold for molding a lens so that the lens formed in the mold has a mark on its surface, which mark corresponds to the recesses and protrusions of the mold. In the former method wherein the mark is engraved by the laser radiation, the thickness of the engraved or marked portions of the lens is inevitably reduced if the depth of engraving by the laser radiation is made relatively large in an attempt to attain a high degree of clarity or visibility of the mark. In this case, the strength of the ophthalmic lens is reduced, and the ophthalmic lens tends to be easily broken. Further, deposits (contaminants, stains) are likely to accumulate in the engraved or marked portions in the form of grooves or recesses, causing undesirable troubles such as irritation of the eye of the lens user. In the latter method wherein the mark is formed on the lens surface corresponding to the recesses and protrusions of the mold, the mark in the form of protrusions formed on the front surface of the ophthalmic lens is in contact with the inner surface of the eyelid during wearing of the lens, so that the lens user may feel uncomfortable. Even if the size of the mark and the amount of protrusion of the mark are made relatively small, it is impossible to completely get rid of the feeling of discomfort.

SUMMARY OF THE INVENTION

The present invention was developed in the light of the background art described above. It is therefore an object of the present invention to provide a method of marking an ophthalmic lens, which method is capable of providing the ophthalmic lens with a marking that can be easily read or recognized with a high degree of visibility or clarity, without giving a feeling of discomfort to a lens user or causing problems such as contamination of the lens and reduction of the strength of the lens.

The object indicated above may be achieved according to the principle of the present invention, which provides a method of marking an ophthalmic lens, comprising a step of irradiating the ophthalmic lens formed of a resin material with a laser radiation of a femtosecond pulse width, such that the laser radiation is condensed at least one predetermined spot within the ophthalmic lens, to form a whitened portion at the at least one predetermined spot, for thereby providing the ophthalmic lens with a marking.

The present method of marking an ophthalmic lens described above is different from the conventional method of marking an ophthalmic lens by irradiating the surface of the lens with a laser radiation, in that the laser radiation of the femtosecond pulse width is condensed at least one predetermined spot within the ophthalmic lens, to form a whitened portion at each of the at least one predetermined spot, thereby providing the ophthalmic lens with a marking in the form of characters, figures, symbols, etc. According to the present marking method, the marking formed in the inner portion of the ophthalmic lens does not yield any protrusions and recesses on its surface, thereby avoiding conventionally experienced problems of deterioration of the lens wearing comfort due to the mark in the form of protrusions formed on the lens surface and irritation of the eye due to the deposits accumulated on or attached to the marks in the form of grooves or recesses formed in the lens surface. Thus, the present method assures the lens user of high degrees of lens wearing comfort and safety while effectively preventing a reduction of the optical properties of the ophthalmic lens due to the deposits adhering to the lens surface.

In the present method wherein the whitened portion which provides the marking is formed by an ultrashort pulse laser radiation of a femtosecond pulse width, the spot within the ophthalmic lens at which the laser radiation is condensed can be determined with high accuracy, so that only the area within the spot and the vicinity of the spot within the ophthalmic lens can be processed by the laser radiation without damaging the surface of the lens. In general, the marking is formed at a peripheral portion of the ophthalmic lens to prevent its optical region (vision correction region) from being adversely influenced by the marking. Accordingly, the marking formed at the peripheral portion of the ophthalmic lens is extremely small and is not recognized by naked eyes. By using the laser radiation of the femtosecond pulse width according to the present invention, it is possible to significantly reduce the size of the whitened portion formed at each spot in the ophthalmic lens at which the laser radiation is condensed. According to the present method, the marking which can be easily read or recognized with a high degree of clarity or visibility is advantageously formed.

In one preferred form of the present invention, the ophthalmic lens is irradiated with the laser radiation such that the marking is located within a predetermined thickness portion of the ophthalmic lens, which predetermined thickness portion has a thickness equal to one half of a thickness of the ophthalmic lens, the predetermined thickness portion having a center of thickness at a center of thickness of the ophthalmic lens. This arrangement advantageously prevents a reduction of the strength of the ophthalmic lens.

In another preferred form of the present invention, the ophthalmic lens is irradiated with the laser radiation such that the marking is located within a predetermined thickness portion of the ophthalmic lens, wherein the predetermined thickness portion has a thickness equal to one fourth of a thickness of the ophthalmic lens, the predetermined thickness portion having opposite ends as seen in a direction of thickness of the ophthalmic lens, one of the opposite ends being located at a center of thickness of the ophthalmic lens while the other of the opposite ends is spaced from the one of opposite ends in a direction toward a back surface of the ophthalmic lens. Where the ophthalmic lens to be marked according to the present invention is a contact lens, external physical forces tend to act on the contact lens in a direction generally from its back surface toward its front surface during handling of the contact lens. The present arrangement effectively prevents cracking of the lens due to the external physical forces, at the whitened portions formed in the inner portion of the lens, so that the ophthalmic lens is protected from being broken.

In still another preferred form of the present invention, the ophthalmic lens is irradiated with the laser radiation such that the marking includes a plurality of whitened portions each formed by the laser radiation such that the plurality of whitened portions have respective different positions in a direction of thickness of the ophthalmic lens, at least one of opposite ends of the each whitened portion. According to this arrangement, the marking to be formed has a higher degree of visibility.

In yet another preferred form of the present invention, the ophthalmic lens is internally colored. The ophthalmic lens according to this arrangement has a high degree of contrast, so that the marking which is provided by the whitened portion formed in the inner portion of the ophthalmic lens has a higher degree of clarity or visibility, resulting in considerably easy reading or recognition of the marking.

In a further preferred form of the present invention, the ophthalmic lens is internally colored with a dye. For instance, the ophthalmic lens is internally colored with at least one of a phthalocyanine compound and an azo-compound which is included in the resin material of the ophthalmic lens.

In a yet further preferred form of the present invention, the ophthalmic lens is formed of a polymer obtained from a polymerizable monomer which contains a methacrylic group or an acrylic group. Preferably, the ophthalmic lens is formed of a polymer obtained from methyl methacrylate. Where the marking is formed in the ophthalmic lens formed of the polymer described above, each whitened portion formed by irradiation of the lens with the laser radiation emits a fluorescent light by exposure to an excitation light. Accordingly, the marking can be easily and clearly read or recognized, with the fluorescent light emitted from the whitened portion formed in the ophthalmic lens.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIGS. 2A and 2B are fragmentary views for explaining a method of marking the ophthalmic lens according to one embodiment of the present invention, wherein FIG. 2A is a vertical cross sectional view of the ophthalmic lens while FIG. 2B is a top plan view of the ophthalmic lens of FIG. 2A;

DETAILED DESCRIPTION OF THE INVENTION

To further clarify the present invention, embodiments of the present invention will be described in detail by reference to the drawings.

Figure 1:
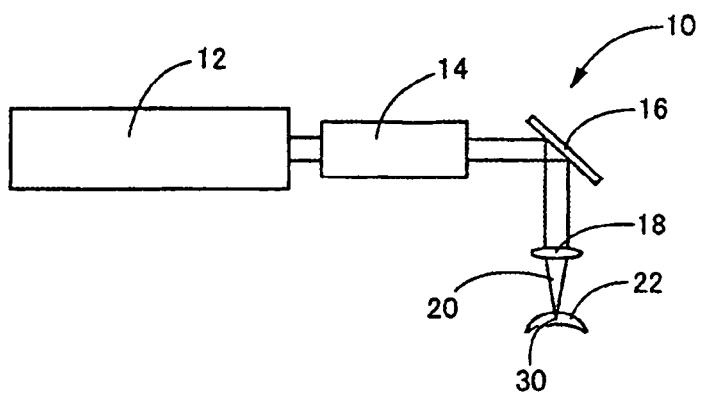
FIG. 1 is a view schematically showing a laser device used as a marking device for marking an ophthalmic lens according to the present invention.

Referring first to FIG. 1, there is schematically shown a laser device 10 used for marking an ophthalmic lens according to the present invention. The laser device 10 includes a femtosecond laser radiation source 12, a pulse shaper 14, a reflecting mirror 16, and a condensing lens 18. The laser device 10 is arranged such that a laser radiation 20 of a femtosecond pulse width in the order between $10^{-15}$ and $10^{-13}$ second is condensed to be incident on a desired portion of an inner portion 26 of an ophthalmic lens to be processed, i.e., a contact lens 22 in the present embodiment.

The ophthalmic lens 22 to be marked according to the present invention may be one of known contact lenses and intraocular lenses formed of resin materials. For instance, the present invention is applicable to: a hard contact lens formed of a polymer material obtained from a polymerizable composition whose major component is, for instance, methyl methacrylate, siloxanyl methacrylate, fluoroalkyl methacrylate, siloxanyl styrene, fluoroalkyl styrene, siloxanyl fumarate, or fluloroalkyl fumarate; a water-absorptive soft contact lens formed of a polymer material obtained from a polymerizable composition whose major component is, for instance, hydroxyethyl methacrylate, N-vinyl pyrrolidone, dimethyl acrylamide, or polyvinyl alcohol; a non-water-absorptive soft contact lens formed of a polymer material obtained from a polymerizable composition whose major component is, for instance, butyl acrylate, siloxanyl acrylate, or fluoroalkyl ether monomer; and an intraocular lens principally formed of a polymer such as a methacrylate polymer. In the present embodiment, the marking is conducted on the contact lens 22 formed of a methyl methacrylate polymer which is obtained from a polymerizable composition whose major component is methyl methacrylate.

For providing the contact lens 22 described above with a predetermined marking, the contact lens 22 is initially placed on a support (not shown). Subsequently, the laser radiation 20 of the femtosecond pulse width is emitted from the laser radiation source 12 of the laser device 10 toward the contact lens 22 placed on the support. In the present embodiment, the predetermined laser radiation 20 of the femtosecond pulse width is condensed to be focused not on its surface 24, but at each of at least one predetermined infinitesimal portion or spot 30 in the inner portion 26 of the contact lens 22. In the present embodiment wherein the laser radiation 20 of the femtosecond pulse width is condensed at each of at least one predetermined infinitesimal portion or spot 30, a whitened portion 28 which appears to be white is formed at each predetermined portion or spot 30 in the inner portion 26 of the contact lens 22 formed of the resin material, without damaging the surface 24 of the lens 22.

It is speculated that the whitened portion 28 is formed for the following reasons: Multiphoton absorption which induces electron excitation is induced only in the irradiated area in the spot 30 and in the vicinity of the spot 30 in the contact lens 22, at which the laser radiation 20 of the femtosecond pulse width is condensed, causing a photochemical reaction, a structural change, or a defect of the lens material, so that the optical properties (refractive index) of the lens material are changed in the spot 30 and its vicinity to form the whitened portion 28. Since the ultrashort pulse laser of the femtosecond pulse width is employed for marking the contact lens 22 in the present embodiment, the contact lens 22 is processed without substantially suffering from an influence of heat, which would take place if a laser of a microsecond or a nanosecond pulse width was employed. Accordingly, the whitened portion 28 can be formed with high accuracy in the selected portion of the inner portion 26 of the contact lens 22 without damaging the lens surface 24. In addition, the size of the portion at which the photochemical reaction takes place can be made smaller than the spot size of the laser radiation 20, depending upon the distribution of the photon density within the spot 30 in the contact lens 22. Accordingly, the present arrangement wherein the laser radiation 20 of the femtosecond pulse width is employed assures more precise or finer processing to mark the contact lens 22, than in the case where the laser of the microsecond or the nanosecond pulse width is employed.

In the present method of marking an ophthalmic lens, the whitened portion 28 formed at each of the at least one predetermined spot 30 in the inner portion 26 of the contact lens 22 can serve as a desired marking. According to this arrangement, the marking yields no protrusions and recesses on or in the lens surface 24, advantageously avoiding the deterioration of the lens wearing comfort and the eye irritation of the lens wearer due to deposits adhering to the protrusions and recesses, and the deterioration of the optical properties of the ophthalmic lens arising from such deposits. Further, the present arrangement wherein the contact lens 22 is marked by the laser radiation 20 of the femtosecond pulse width does not use any printing liquid which includes a dye, etc., thereby preventing the eye of the lens user from being adversely influenced by the dye. Thus, the present arrangement assures the lens user of excellent lens wearing comfort and a high degree of safety.

The advantages described above are obtained, as long as the whitened portion 28 which functions as the marking is formed in the inner portion 26 of the contact lens 22. Since the ophthalmic lens in the form of the contact lens 22 to be irradiated with the laser radiation is a thin plate member, the strength of the lens tends to be lowered by irradiation of the lens with the laser radiation. For permitting the contact lens 22 to maintain a high degree of strength, it is preferable that the whitened portion 28 is formed within a predetermined thickness portion (first thickness portion) of the contact lens 22, as indicated at "A" in FIG. 2A, which first thickness portion has a thickness equal to one half of a thickness "D" (FIG. 2A) of the contact lens 22 and has a center of thickness at a thickness center "C" (FIG. 2A) of the contact lens 22. It is particularly preferable that the whitened portion 28 is formed within a predetermined thickness portion (second thickness portion) of the contact lens 22, which second thickness portion has a thickness equal to one fourth of the thickness "D" of the contact lens 22 and has opposite ends as seen in a direction of the thickness "D" of the contact lens 22, one of the opposite ends being located at the center "C" of the thickness of the contact lens 22 while the other of the opposite ends is spaced from the above-indicated one of the opposite ends in a direction toward a back surface 34 of the contact lens 22. Where the ophthalmic lens, especially the contact lens 22 is handled or subjected to a cleaning operation, for instance, the contact lens 22 receives external physical forces that generally act in a direction from its back surface 34 toward its front surface 32, due to its configuration. Accordingly, owing to the whitened portion 28 formed in the above-indicated second thickness portion on the side of the back surface 34 of the contact lens 22, the contact lens is effectively protected from being broken.

Figures 3, 4:
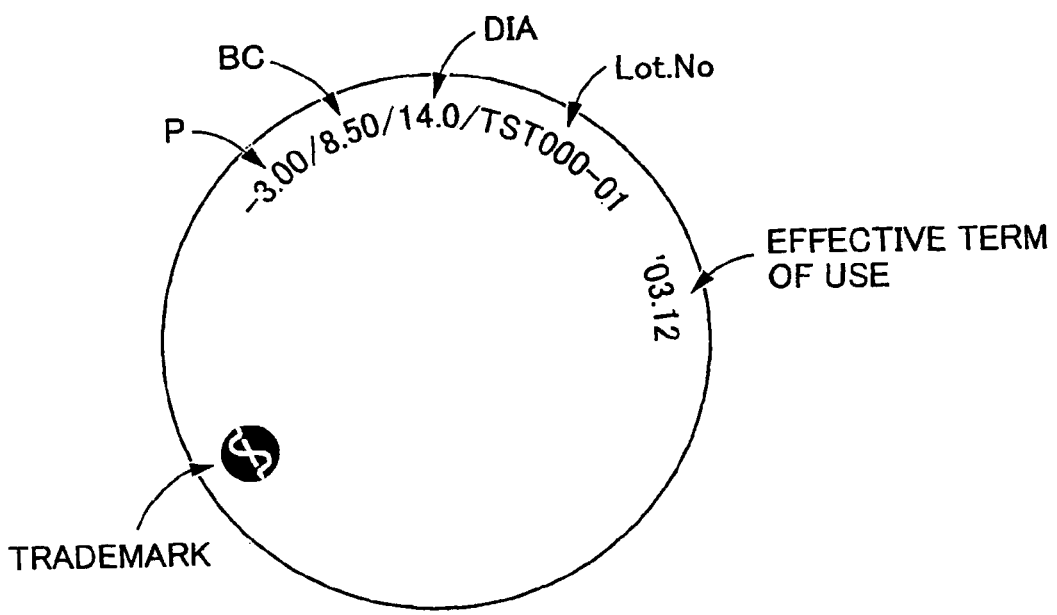
FIG. 3 is a plan view showing the ophthalmic lens in which a marking is formed according to the present invention.
FIG. 4 is a fragmentary enlarged view showing a part of the marking of FIG. 3.

For forming the whitened portion 28 described above to provide the contact lens 22 with the desired marking in the form of characters, figures, and symbols as shown in FIG. 3 by way of example, there are employed any known methods. For instance, the contact lens 22 or the laser device 10 is moved along at least one of an X-axis direction, a Y-axis direction, and a Z-axis direction, depending upon the configuration of the marking to be formed, for thereby changing the position of the spot 30 in the inner portion 26 of the contact lens 22 at which the laser radiation 20 is condensed. Alternatively, the laser radiation 20 is condensed at a plurality of portions in the inner portion 26 of the contact lens 22, for forming the desired marking. FIG. 3 shows a typical example of the marking formed in the inner portion 26 of the contact lens 22, wherein a plurality of whitened portions 28 cooperate to indicate the specifications of the lens, production lot number, effective term of use, and trademark.

Figure 2A:
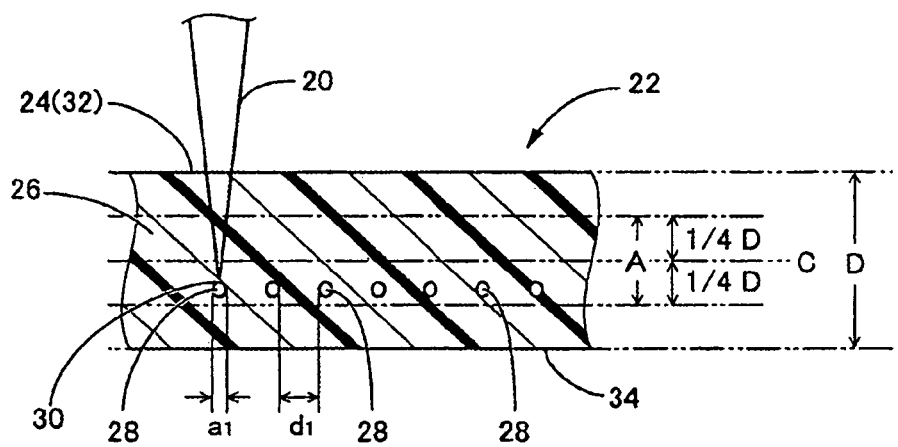
Figure 2B:
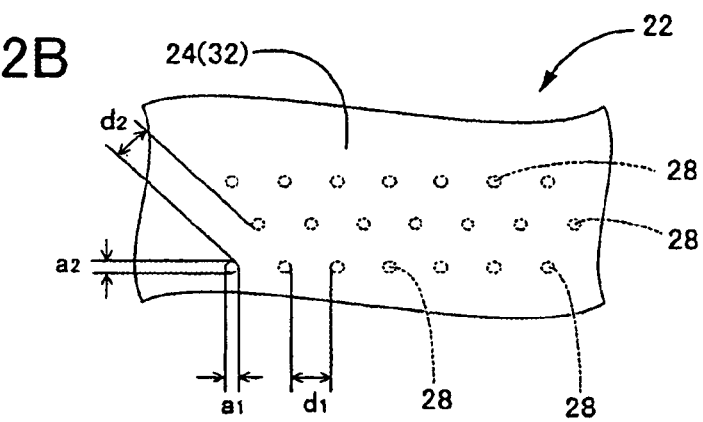

Described more specifically, the marking shown in FIG. 3 is constituted by a matrix of whitened portions 28 which are spaced apart from each other by a predetermined distance, as shown in FIG. 4. Where the marking is constituted by the matrix of whitened portions 28 as described above, the size of each whitened portion 28 is not particularly limited, and is preferably determined such that the maximum diameter of each whitened portion 28 indicated by "$a_1$" and "$a_2$" in FIGS. 2A and 2B is preferably held in a range from 0.5 μm to 3 μm. The size of the whitened portion 28 is changed by suitably adjusting the intensity of the laser radiation 20 emitted from the laser radiation source 12, for instance. If the diameter ("$a_1$", "$a_2$") of the whitened portion 28 is excessively small, the marking to be provided by the whitened portion 28 has poor clarity or visibility. If the diameter of the whitened portion 28 is excessively large, the strength of the contact lens 22 is undesirably lowered, resulting in a risk of cracking of the contact lens 22 during its handling.

The distance between the adjacent ones of the whitened portions 28 indicated by "$d_1$" and "$d_2$" in FIGS. 2A and 2B is not particularly limited, and is preferably held in a range from 1 μm to 100 μm, more preferably in a range from 3 μm to 50 μm. In this respect, it is noted that adjacent cracks which may occur in the lens tend to be easily connected together if the distance ("$d_1$", "$d_2$") is excessively small. If the distance is excessively large, on the other hand, a marking having a complicated configuration may not be clearly visible.

Figure 5:
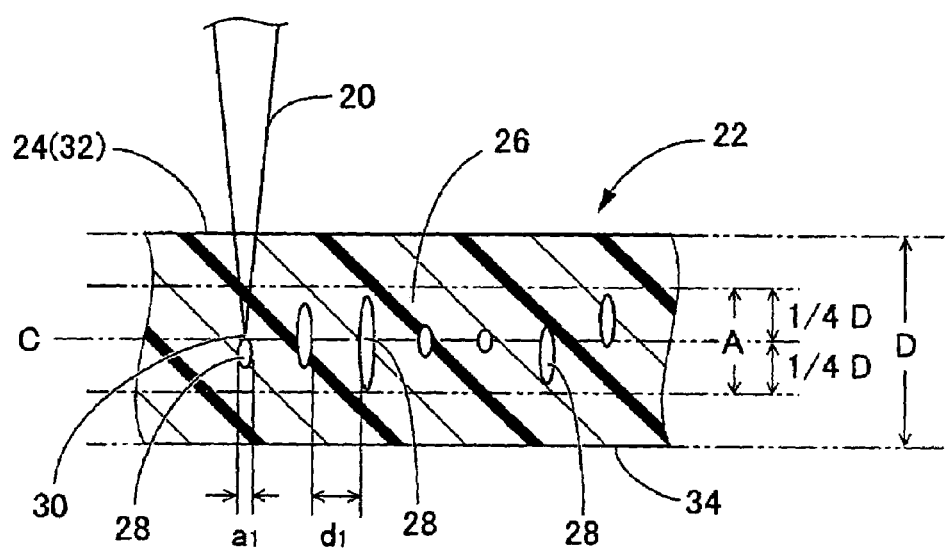
FIG. 5 is a fragmentary view showing an ophthalmic lens in vertical cross section, for explaining a method of marking the ophthalmic lens according to another embodiment of the present invention.

The plurality of whitened portions 28 need not be arranged such that corresponding ends of the plurality of whitened portions 28 as seen in the direction of the thickness "D" of the contact lens 22 are located at the same position in the direction of thickness of the contact lens 22, shown in FIG. 2A. That is, the plurality of whitened portions 28 may be arranged such that the corresponding ends (on the side of the front surface 32 and/or on the side of the back surface 34) of the whitened portions 28 as seen in the direction of thickness of the contact lens 22 may be located at respective different positions in the direction of thickness of the contact lens 22, as shown in FIG. 5. According to this arrangement, the light which passes through the contact lens 22 can be effectively scattered, enabling the marking to be read or recognized with a higher degree of clarity or visibility.

Even if each of the whitened portions 28 to be formed is extremely small, the laser radiation 20 of the femtosecond pulse width can be condensed at each spot 30 in the inner portion 26 of the contact lens 22 with high accuracy and controllability. According to the present method, the number of the whitened portions 28 which constitute the marking, in other words, the number of marking dots can be advantageously increased, so that the marking formed according to the present method has a significantly higher degree of resolution than the conventional marking. Thus, the marking formed according to the present method can be easily recognized or identified.

According to the present method, the marking operation is performed on the contact lens 22 formed of the methyl methacrylate polymer (PMMA) which is obtained from the methyl methacrylate (MMA). Accordingly, if a suitable excitation light (350 nm–380 nm) is incident on the marked portion of the contact lens 22, the marked portion (the whitened portion 28) is excited such that a broad emission spectrum in a wide wavelength range of 500–700 nm is detected in the marked portion. It is speculated that the light emission from the marked portion upon exposure to the excitation light arises from breakage of the main chain of the PMMA by the laser radiation 20. However, the mechanism is not clear. By utilizing the characteristics described above, the fluorescent light emitted from the marked portion of the contact lens 22 upon exposure to the suitable excitation light can be detected, so that the marking formed in the contact lens 22 can be easily recognized or identified.

For permitting the marking formed in the contact lens 22 to be read or recognized with a higher degree of visibility or clarity, it is preferable that the contact lens 22 is internally colored, in other words, the inner portion 26 of the contact lens 22 is colored, prior to the marking operation. In this case, the whitened portion 28 has a high degree of contrast with respect to the transparent, colored portion, whereby the marking can be read or recognized with a high degree of visibility or clarity. Where only the surface of the contact lens 22 is colored, the whitened portion 28 does not have a high degree of contrast with respect to the colored portion, resulting in insufficient visibility or clarity of the making. In view of this, it is preferable that the contact lens 22 is internally colored. The color of the contact lens is not limited, provided that the colored contact lens 22 is not opaque, but is light-transparent. For example, the contact lens 22 is preferably colored green, blue, yellow, or red, from the standpoint of the visibility of the marking.

The contact lens 22 is colored with known coloring agents such as dyes and pigments. For coloring the contact lens 22, selected at least one of the known coloring agent is contained in the resin material for the contact lens 22 such that the coloring agent added to the polymerization system is copolymerized. Alternatively, the coloring agent or agents is/are added to the resin material for the contact lens 22. As the coloring agent (dye) for coloring the contact lens 22, at least one of a phthalocyanine compound and an azo-compound which includes an azo pigment and an azo dye is advantageously employed, for easy recognition of the whitened portion 28.

The contact lens 22 colored with the dye which is contained in or added to the resin material is subjected to the marking operation such that the predetermined laser radiation 20 is condensed at each of the at least one predetermined spot 30 of the inner portion 26 of the contact lens 22, which at least one spot 30 is located at a predetermined position as seen in the direction of thickness of the contact lens 22. The thus formed marking can be read or recognized with a high degree of visibility or clarity since the whitened portion 28 has a higher degree of contrast with respect to the transparent colored portion than a contact lens not colored.

The laser employed for marking the contact lens 22 according to the present method is not particularly limited, as long as the laser has a pulse width in the femtosecond range, i.e., in the order from $10^{-15}$ to $10^{-13}$ second. There may be employed various known types of lasers such as a tunable solid-state laser whose typical example is a Ti:sapphire laser. It is particularly preferable to use a laser whose pulse width is held in a range from 1 fs to 500 fs. It is possible to form the whitened portion in the inner portion 26 of the contact lens 22 by employing the laser of the microsecond or nanosecond pulse width. With the laser of the microsecond or nanosecond pulse width, however, the range of energy in which a change of the optical properties (refractive index) is caused is very small, so that it is difficult to control the energy of the laser. Further, cracks tend to be generated, undesirably resulting in a high defect or reject ratio of the contact lens. Even if the whitened portion is formed by using the laser of the microsecond or nanosecond pulse width, the whitened portion formed by the laser of the microsecond or nanosecond pulse width has a size much larger than that formed by the laser of the femtosecond pulse width. Accordingly, it is difficult to form a clear marking consisting of a large number of dots, in other words, a clear marking having a high degree of resolution. In addition, there is a high possibility that the mechanical strength of the contact lens 22 is lowered.

The oscillation wavelength of the femtosecond laser is not particularly limited, and is suitably determined depending upon the specific type of the laser radiation source 12 to be employed. It is preferable to use a visible light. Where the titanium sapphire laser is employed, the oscillation wavelength is preferably 400 nm or 800 nm corresponding to the fundamental or harmonic frequency. The pulse energy and the number of pulses of the femtosecond laser are not particularly limited, and is suitably determined depending upon various factors such as the laser radiation source 12, the oscillation wavelength of the laser radiation 20, the material of the contact lens 22, and the size of the whitened portion 28 to be formed. Where the titanium sapphire laser is used, the pulse energy is preferably held in a range of 0.01–0.1 $\mu$J/pulse, and the number of pulses is held in a range of 1–1000. If the pulse energy and the number of pulses of the laser radiation 20 are excessively large, the intensity of the laser radiation 20 is excessively high, undesirably giving an adverse influence to the contact lens 22.

While the presently preferred embodiments of this invention have been described in detail by reference to the accompanying drawings, the invention is not limited to the details of the foregoing description, but may be otherwise embodied.

In the illustrated embodiments, the laser radiation 20 is incident on the contact lens 22 in a direction from the front surface 32 toward the back surface 34. The direction of incidence of the laser radiation 20 is not limited to that in the illustrated embodiments. The laser radiation 20 may be incident on the contact lens 22 in a direction from the back surface 34 toward the front surface 32.

In the illustrated embodiments, the specifications of the lens, the production lot number, the effective term of use, and the trademark are marked in the ophthalmic lens (the contact lens 22), as shown in FIG. 3. There may be formed any other marking in the form of characters, figures, symbols, etc., for distinction between the front and back surfaces of the lens or between lenses for the left and right eyes.

The condensing lens 18 for condensing the laser radiation 20 at each predetermined spot 30 in the inner portion 26 of the contact lens 22 is not particularly limited. Various known condensing lenses may be used.

In the illustrated embodiments, the ophthalmic lens in the form of the contact lens 22 formed of the PMMA is marked according to the present method. Contact lenses and intraocular lenses formed of other resin materials may be marked in a manner similar to that employed for marking the contact lens 22 formed of the PMMA. The laser device 10 may be otherwise arranged. For instance, the laser device 10 may be modified such that the laser radiation emitted from the laser radiation source 12 is split into a plurality of laser beams.

It is to be understood that the present invention may be embodied with various changes, modifications and improvements, which may occur to those skilled in the art, without departing from the spirit and scope of the invention defined in the attached claims.

EXAMPLES

There will be described some examples of the present invention to further clarify the present invention. It is to be understood, however, that the present invention is not limited to the details of the following examples.

As the ophthalmic lens to be marked, there were prepared two plates (contact lenses) each having a thickness of 100 $\mu$m, by polymerizing a polymerizable composition containing methyl methacrylate and trimethyl silylpropyl methacrylate in a proportion of 50:50 by weight. One of the thus prepared two contact lenses was colored green by adding copper phthalocyanine in an amount of 0.005 wt. % to the polymerizable composition in the polymerization process. As the laser radiation source, a titanium sapphire laser was used.

Each contact lens was positioned on a three-axis piezoelectric actuator such that the laser radiation emitted from the laser radiation source was incident upon a desired portion of the contact lens and such that the laser radiation was focused at a predetermined position in the inner portion of the contact lens in the direction of thickness thereof. A condensing lens having a magnification of ×100 was used.

A laser radiation having a pulse width of 150 fs, a center wavelength of 800 nm, and a pulse energy of 0.05 $\mu$J/pulse was emitted from the laser radiation source, such that the number of pulses of the laser radiation was equal to 100. The laser radiation emitted from the laser radiation source as described above was condensed by the condensing lens at the predetermined portion of the inner portion of the contact lens, as seen in the direction of thickness of the contact lens, so that the density of the photon at that thickness portion, i.e., the spot at which the laser radiation was condensed was increased to exceed a predetermined threshold value. Thus, there was formed a substantially spherical whitened portion at the spot in the inner portion of the contact lens. The operation of irradiating the inner portion of the contact lens with the laser radiation was repeated while the contact lens was moved, whereby fifteen whitened portions were formed in the inner portion of the contact lens such that those whitened portions were equally spaced apart from each other by a distance of 3 $\mu$m so as to provide the contact lens with a marking in the form of a straight line.

In each of the contact lenses marked as described above, the marking in the form of the straight line was formed with a high degree of visibility or clarity, and the marking was recognized by naked eyes. Each of the whitened portions which constitute the marking was spaced from the back surface of the contact lens by a distance of about 32–35 $\mu$m in the direction of thickness of the contact lens, which distance is substantially equal to one third of the thickness of the contact lens. No recesses, no protrusions, and no cracks were observed on the surface of the contact lens. In the transparent contact lens colored green with the dye (the phthalocyanine compound), the marking can be easily read or recognized than that formed in the transparent, colorless contact lens.

The transparent, colorless contact lens was irradiated with an excitation light of 365 nm, and there was detected a light of 500–700 nm by using a CCD camera (available from KABUSHIKI KAISHA HAMAMATSU PHOTONICS, Japan). It was confirmed that a fluorescent light was emitted from the marked portion of the contact lens, so that the marking could be easily read or recognized.

As is apparent from the foregoing description, according to the present method of marking an ophthalmic lens, the laser radiation is condensed at each of the at least one predetermined spot in the inner portion of the ophthalmic lens formed of the resin material, to form the whitened portion at each predetermined spot, for thereby providing the ophthalmic lens with the marking. Accordingly, the present method assures the lens user of excellent lens wearing comfort and a high degree of safety. Further, the present method prevents the stains and deposits from adhering to the marked portion of the ophthalmic lens, and protects the ophthalmic lens from being broken due to a reduction in its mechanical strength.

In the present method wherein the ultrashort pulse laser radiation of the femtosecond pulse width is employed for marking the ophthalmic lens, the spot in the inner portion of the ophthalmic lens at which the laser radiation is condensed can be determined with high accuracy, and only the selected spot and its vicinity can be processed by the laser radiation without damaging the surface of the lens. By using the laser radiation of the femtosecond pulse width according to the present invention, it is possible to significantly reduce the size of the whitened portion formed at the spot in the ophthalmic lens at which the laser radiation is condensed. Therefore, the present method advantageously permits formation of the marking which has a high degree of resolution and which can be easily read with a high degree of visibility or clarity.

What is claimed:

1. A method of marking an ophthalmic lens, comprising a step of irradiating the ophthalmic lens formed of a resin material with a laser radiation such that the laser radiation passes through a surface of the ophthalmic lens and is condensed at each of at least one predetermined spot within the ophthalmic lens, to change the optical properties of the resin material at said each of at least one said predetermined spot, thereby providing a marking only within the ophthalmic lens.

2. A method according to claim 1, wherein said ophthalmic lens is irradiated with said laser radiation such that said marking is located within a predetermined thickness portion of the ophthalmic lens, wherein the predetermined thickness portion has a thickness equal to one half of a thickness of the ophthalmic lens, said predetermined thickness portion having a center of thickness at a center of thickness of the ophthalmic lens.

3. A method according to claim 1, wherein said ophthalmic lens is irradiated with said laser radiation such that said marking is located within a predetermined thickness portion of the ophthalmic lens, wherein the predetermined thickness portion has a thickness equal to one fourth of a thickness of the ophthalmic lens, said predetermined thickness portion having opposite ends as seen in a direction of thickness of the ophthalmic lens, one of said opposite ends being located at a center of thickness of the ophthalmic lens while the other of said opposite ends is spaced from said one of opposite ends in a direction toward a back surface of the ophthalmic lens.

4. A method according to claim 1, wherein said ophthalmic lens is irradiated with said laser radiation thereby providing said marking within the ophthalmic lens which includes a plurality of markings each formed by said laser radiation such that at least one of opposite ends of each of said markings have respective different positions in a direction of thickness of the ophthalmic lens.

5. A method according to claim 1, wherein said ophthalmic lens is internally colored.

6. A method according to claim 4, wherein said ophthalmic lens is internally colored with a dye.

7. A method according to claim 5, wherein said ophthalmic lens is internally colored with at least one of a phthalocyanine compound and an azo-compound which is included in said material of the ophthalmic lens.

8. A method according to claim 1, wherein said ophthalmic lens is formed of a polymer obtained from a polymerizable monomer which contains a methacrylic group or an acrylic group.

* * * * *